United States Patent [19]
Rudolphy et al.

[11] Patent Number: 4,904,303
[45] Date of Patent: Feb. 27, 1990

[54] WATER-DILUTABLE PRINTING INK BINDER SYSTEM AND USE THEREOF AS PRINTING INK

[75] Inventors: Albert Rudolphy, Wiesbaden; Helmut Eckes, Eppstein/Taunus, both of Fed. Rep. of Germany

[73] Assignee: Hoechst AG, Fed. Rep. of Germany

[21] Appl. No.: 251,662

[22] Filed: Sep. 29, 1988

Related U.S. Application Data

[62] Division of Ser. No. 924,355, Oct. 28, 1986, Pat. No. 4,792,356.

[30] Foreign Application Priority Data

Oct. 30, 1985 [DE] Fed. Rep. of Germany ....... 3538549

[51] Int. Cl.$^4$ .............................................. C09D 11/08
[52] U.S. Cl. ...................... 106/30; 106/239; 106/400; 106/472; 524/77; 525/54
[58] Field of Search ................. 106/30, 239, 400, 472; 524/77; 525/54

[56] References Cited

U.S. PATENT DOCUMENTS

| | | | |
|---|---|---|---|
| 3,361,582 | 1/1968 | Lewis | 106/14.5 |
| 4,116,910 | 9/1978 | Rudolphy | 524/270 |
| 4,198,329 | 4/1980 | Rudolphy et al. | 106/30 |
| 4,310,356 | 1/1982 | Trubiano et al. | 106/25 |
| 4,506,059 | 3/1985 | Hultzsch et al. | 106/30 |
| 4,528,036 | 7/1985 | Rudolphy | 106/30 |

Primary Examiner—Paul Liberman
Assistant Examiner—Willie J. Thompson
Attorney, Agent, or Firm—Bierman & Muserlian

[57] ABSTRACT

Water-dilutable printing ink binder system based on a binder in the form of a clear, dilute, ammoniacal or amine-containing solution, the binder being a product of reacting a natural resin acid and formaldhyde in at least one stage, the amount of (100% strength) formaldehyde being 1 to 25% by weight, based on the natural resin acid, and the reaction having been carried out under atmospheric or superatmospheric pressure in the absence or in the presence of 0.1 to 2% by weight of a lewis catalyst. A variant comprises partially esterifying the natural resin acid/formaldehyde reaction product with at least one polycarboxylic acid unit of the group (a) an ethylenically unsaturated dicarboxylic acid and/or the anhydride thereof and (b) a hydroxycarboxylic acid. The binder system has added to it as solubilizers monohydric and/or polyhydric alcohols, and the pH value is preferably set to 7.5 to 10. The binder systems are used as printing varnishes or in combination with carbon black or colored pigments and if desired further customary additives as printing inks, in particular for flexographic printing, letterpress printing and offset printing.

6 Claims, No Drawings

WATER-DILUTABLE PRINTING INK BINDER SYSTEM AND USE THEREOF AS PRINTING INK

PRIOR APPLICATION

This application is a division of U.S. patent application Ser. No. 924,355 filed Oct. 28, 1986, now U.S. Pat. No. 4792356.

Printing inks have hitherto in general been prepared on the basis of organic solvent systems which also contain for example binders based on natural resin acids. These systems have proved highly suitable. However, to reduce the pollution of the environment, including in particular that of the personnel in printing plants, it is desirable to develop systems which contain no or a reduced amount of organic solvents.

U.S. Pat. No. 2,754,218 already describes a printing ink on the basis of alkali metal or alkaline earth metal alkylarysulfonate in admixture with a pigment and also mineral oil and water as solvent where the water content can be between 5 and 50% of the mixture. The disadvantage is the mineral oil content.

U.S. Pat. No. 3,361,582 discloses a printing ink mixture which contains water and little ammonia and which is essentially based on sulfonated castor oil, casein or dextrin and formaldehyde. The formaldehyde present therein acts as an antibacterial additive for the casein. The disadvantage of this system is the large number of components required in the preparation.

U.S. Pat. No. 4,310,356, furthermore, describes an aqueous printing ink mixture which, in addition to carbon black, contains dispersed starch as binder and can, if desired, also contain up to 5% of mineral oil or organic solvents. The disadvantage is that the presence of starch in aqueous solution frequently affects the viscosity in the course of time, so that gelling occurs, especially at low temperatures. It is true that this effect can be reduced by chemical and/or physical modification of the starch or by adding viscosity stabilizers in the form of mineral salts, but this requires an additional outlay of time and material.

European Patent Application 117,452 contains a printing ink mixture which, in addition to a sulfated or sulfonated organic binder, for example sulfonated tall oil fat acids, contains the viscosity-controling agents which also act as cobinders, for example soya protein or a plurality of natural and synthetic water-dispersible polymeric substances, and also antifoam agents and water as solvent. In addition, an acid or a base can be used for setting the pH value. In this case too, it is necessary to select a large number of substances in order to obtain the correct formulation of the mixture.

However, all the known systems describe combinations which differ from the systems of the present invention.

Reaction products of natural resin acids with formaldehyde are only known as intermediates from German Patent 2,755,825. They are converted in further reactions steps into binders for printing inks. Using them on their own for preparing printing inks has hitherto not been disclosed.

The reaction of natural resin acids with formaldehyde in the presence of dehydration catalysts is known from French Offenlegungsschrift 2,255,332. Said specification, however, provides no indication of the use of the resulting products in printing inks.

The present invention has for its object to use components which are relatively simple to prepare to obtain a completely clear and stable aqueous printing ink system for preparing high-grade printing inks without using a large number of special additives.

The present invention overcomes the disadvantages of the known printing ink systems by proposing a water-dilutable printing ink binder system which has a simple composition and is based on a binder in the form of a clear, dilute, ammoniacal or amine-containing solution, the binder being a product of reacting a natural resin acid and formaldehyde in at least one stage, the amount of (100%) formaldehyde being 1 to 25% by weight, based on the natural resin acid, and the reaction having been carried out under atmospheric or superatmospheric pressure in the absence or in the presence of 0.1 to 2% by weight of a Lewis catalyst.

The binder may contain minor amounts of monohydric and/or polyhydric alcohols such as methanol, isopropanol, preferably ethanol or even ethylene glycol monoethyl ether.

Suitable amines for preparing the resin solution are in particular amino alcohols, for example diethanolamine, triethanolamine, diisopropanolamine, dimethylaminoethanol, although ammonia is in general to be preferred. To avoid unnecessary ammonia odor, the reaction product can be dissolved with the lowest possible ammonia concentration, or formaldehyde is added to the resin solution which has an ammonia odor until the odor is absent, i.e. to form odorless hexamethylenetetramine, which remains in solution and is not a nuisance. It is particularly advantageous to dissolve the natural resin acid/formaldehyde reaction product in 3 to 7% strength ammonia solution. The presence of ammonia ensures that even any residues of free formaldehyde in the natural resin reaction products are converted into substances of neutral odor.

The system according to the invention expediently has a pH value of 7.5 to 10, preferably 8 to 10. Maintaining this pH value favors the formation of water-soluble salts.

Suitable natural resin acids are for example rosin, in particular balsam resin, wood resins, tall resins, in each case individually or in admixture.

The preparation of the natural resin acid/formaldehyde reaction products can be effected in various ways. For instance, the products obtained as described in German Patent 2,755,825 in accordance with stage (a) can be used as binders. In this process, natural resin acids are reacted under superatmospheric pdressure and at a temperature of 100° to 200° C., preferably 120° to 180° C., with 7.5 to 12 percent by weight of a polymeric formaldehyde which can be used for example in the form of trioxane, but preferably as paraformaldehyde, based on the natural resin acids.

It is expedient to carry out this reaction under a pressure of 2 to 10 bar, preferably 3 to 6 bar. In some cases, however, it is possible to employ a superatmospheric pressure outside this range.

The reaction products prepared in this process step, even on dissolving in dilute ammonia or in an amine-containing solution which has a temperature of below 50° C., surprisingly do not produce any gels but clear varnishes which are further dilutable with water. For the purposes of this specification, "water" is to be understood as meaning types of water which do not affect the printing ink binder systems adversely, for example by cloudiness or the like.

The reaction product obtained at this stage, however, can also be further treated in a second stage in accordance with stage (b) of the cited patent, the temperature being raised to at least 200° C., but by at least 20° C., and reaction being allowed to proceed with partial esterification under atmospheric pressure until an acid number of 115 to 135 is obtained. The partial esterification in stages (a) and (b) is caused by esterification between the COOH groups of the natural resin acid and the methylol groups formed in the course of the reaction with the polymeric formaldehyde, and is an intramolecular esterification.

However, unlike the above-described products which are prepared by a one-stage process, the reaction products obtained in this stage, for example at temperatures of 200° to 260° C., however, require a minor alcohol content in order to obtain clear varnishes which are highly further dilutable with water.

However, the natural resin acid/formaldehyde reaction products can also be prepared under atmospheric pressure in a one-stage process. In this case, however, it is expedient to work in the presence of Lewis acids in order to obtain a sufficient degree of conversion of the components. In this process, which is carried out with aqueous or polymeric formaldehyde, high-boiling hydrocarbons such as toluene, xylene, benzin or the like may be present if desired. Suitable Lewis acids are for example sulfuric acid, p-toluenesulfonic acid, boron trifluoride/acetic acid, zinc chloride or the like. Reaction products which have been prepared by this kind of process generally require the presence of different amounts of alcohol, for example 2 to 15% by weight, based on the total varnish solution, to obtain clear solutions. If it is desired to work without Lewis acids, for example with aqueous formaldehyde, it is generally advantageous to partially esterify the first stage reaction products with aliphatic unsaturated or hydroxyl-containing saturated polycarboxylic acids such as fumaric acid, maleic acid or the anhydride thereof, citric acid, malic acid or mixtures thereof, in order to obtain adequate solubility in dilute ammonia or the amine solution. In general, however, the reaction will be carried out under superatmospheric pressure without Lewis acids, and the resulting reaction products will be preferred since the preparation thereof is simpler and the solutions obtained do not present any problems in the dilution with water.

In the preparation of the unesterified natural resin acid/formaldehyde reaction products, care must in general be taken to ensure that a sufficiently high proportion of formaldehyde is converted. The preferred range when employing super-atmospheric pressure is 4 to 18, in particular 9 to 14, % by weight of (100% strength) formaldehyde, based on natural resin. In the reaction under atmospheric pressure it is also possible to increase the formaldehyde content up to 25% by weight, since formaldehyde losses can occur in the course of the reaction. This is because it has been found that if too little formaldehyde is present the desired optimal solution properties are not obtained in every case. In the case of a formaldehyde content of less than 4% by weight, for example, the addition of large amounts of monohydric and/or polyhydric alcohols can be necessary in order to obtain clear solutions.

In some cases, as already mentioned, it can be expedient to add to the system in addition a minor amount, based on the total solution, of monohydric and/or polyhydric alcohols as cosolvents. Suitable alcohols are for example glycols, polyglycols, which however retard the drying of the varnishes or of the inks, but in particular lower monohydric alcohols such as those already mentioned. The alcohol content can vary, depending on the nature of the natural resin acid/formaldehyde reaction product. Expediently the alcohol content should be as low as possible, i.e. no higher than 30, preferably no higher than 25, % by weight, based on the total solution.

If tall resins are used in place of balsam resin in the preparation of natural resin acid/formaldehyde reaction products, the products obtained frequently require small additions of monohydric and/or polyhydric alcohols, preferably ethyl alcohol, to prepare clear varnishes. This is necessary due to the higher amount of unhydrolyzables in tall resin.

The invention therefore also relates to processes for preparing the printing ink binder systems according to the invention.

The invention further relates to printing ink binder systems in which the binder is a natural resin/formaldehyde reaction product which has been partially esterified with at least one polycarboxylic acid unit of the group (a) an ethylenically unsaturated dicarboxylic acid and/or the anhydride thereof and (b) a hydroxycarboxylic acid. Suitable dicarboxylic acids are in particular maleic acid and/or the anhydride thereof and fumaric acid. Suitable hydroxycarboxylic acids are for example lactic acid, malic acid, citric acid or the like. The proportion of dicarboxylic acids is expediently 3 to 25, preferably 5 to 15, % by weight, and that of hydroxycarboxylic acids 5 to 30, preferably 10 to 20, % by weight, in each case based on the natural resin acid/formaldehyde reaction product. The reaction with the dicarboxylic acid unit is in general carried out at 160° to 260° C., while the reaction with hydroxycarboxylic acids is customarily carried out at between 140° and 240°, preferably 160° to 240° C.

The partial esterification with polycarboxylic acids has the advantage that in this way the properties of the binder system can be influenced. It is thus possible, for example, to prepare higher-melting and more viscous products of enhanced polarity which feature rapid drying or an increased solubility.

Although the partial esters obtained with polycarboxylic acids have a higher molecular weight and are more polar than the unesterified reaction product, they are nonetheless readily soluble in the dilute amine-containing, preferably ammoniacal, solutions. Clear solutions, even on further dilution, are obtained in the case of partial esters with maleic acid or maleic anhydride without added alcohol. By contrast, it is expedient to obtain with the partial esters of fumaric acid or with the hydroxycarboxylic acids further dilution to clear solutions by adding a little alcohol, for example ethanol. The partial esterification with polycarboxylic acids introduces sufficient carboxyl groups into the natural resin acid/formaldehyde reaction products, which raise the acid number and bring about adequate solubility in the amine-containing or ammoniacal solutions. If the reaction products are modified in this way it is possible to keep the formaldehyde content very low; for example, a minimum of 2% by weight of formaldehyde is sufficient to obtain usable varnishes. This is surprising since in-house experiments have shown that varnishes which are addition products of unmodified natural resin acids and the polycarboxylic acids mentioned, which have thus been prepared without a formaldehyde component, have unfavorable solution properties. It is true that with these samples it is possible to obtain clear varnishes by adding ethanol at 80° C., but these samples undergo gelling on cooling down to 25° C. Such products cannot be used as binders in water-dilutable printing ink binder systems.

To reduce the viscosity, the printing ink binder system, in particular when present in combination with carbon black or pigments, can additionally have added to it according to the invention sugars and/or urea and/or tripolyphosphate in an amount of up to 50, preferably up to 30, % by weight, based on the total solids content.

The invention also relates to the use of binder systems according to the invention as printing varnish, in particular for letterpress and offset printing, or in combination with carbon black or colored pigments as printings, in particular for flexographic printing. The proportion of added pigment can be up to 50, preferably 5 to 20, % by weight, based on the binder. The printing inks can furthermore contain further customary additives, such as printing assistants, extenders and antifoam agents or the like. The present invention comprises not only an environmentally acceptable system without mineral oil, but in addition helps to produce varnishes and printing inks which, surprisingly, dry quickly and have excellent adhesion on films, board, cardboard, natural and newsprint papers, a high gloss and also a high abrasion resistance. A further advantage of the pigmented printing inks according to the invention is the fact that, immediately after their application, they do not strike through, even in the case of absorbent substrates, for example newsprint, and that their abrasion resistance is higher than that of conventional printing inks of the type prepared with mineral oils and in general still predominantly used in newspaper printing.

In the examples below, p denotes parts by weight and % denotes percent by weight. The viscosity data refer in each case to 66.6% strength toluene solutions at 20° C. unless otherwise stated. The melting points (m.p.) were in each case determined by the capillary method.

EXAMPLES

1 and 2

(I) Preparation of the natural resin acid/formaldehyde reaction products (1a) 1000 p of Portuguese rosin (m.p. 65° C., acid number 165) were melted, and the warm batch at 100° to 120° C. had added to it 95 p of paraformaldehyde. The mixture was reacted at 160° C. and 3.5 bar for 300 min.

Yield 1090 p, m.p. 72° C., said number 145, viscosity 950 mPa.s.

(2a) A portion of the product obtained in Example 1 a) was heated in successive stages to 180°, 200° and 230° C. for 60 min in each case. Parameters of the product obtained: m.p. 83° C., acid number 128, viscosity (66.7% in toluene) 480 mPa.s.

(II) Preparation of the water-dilutable system

Reaction products (1a) and (2a) were in each case used to prepare a varnish having the following constituents.

TABLE I

| Varnish | (1b) | (2b) |
| --- | --- | --- |
| Water/p | 290 | 290 |
| Ammonia 25% strength/p | 60 | 60 |
| Pulverized sample (1a)/p | 150 | |

TABLE I-continued

| Varnish | (1b) | (2b) |
| --- | --- | --- |
| Pulverized sample (2a)/p | — | 150 |
| Appearance at 50° C. | clear | cloudy |
| Addition of ethyl alcohol/p | — | 80 |
| Appearance after cooling down to 25° C. | clear | clear |
| Viscosity/mPa.s | 2300 | 150 |
| Dilutability 1 p of varnish:p of water | 1:10 | 1:2 |

As the comparison of the solution properties shows, sample (1a) can be diluted with water without added alcohol being required. By contrast, sample (2a) only turns clear after addition of alcohol at 50° C. and stays clear at room temperature. However, on further dilution beyond a varnish:water ratio of 1:2 further alcohol must be added. However, both samples result in varnishes having good solution properties.

Varnishes (1b) and (2b) were applied by means of a doctor blade to polyvinyl chloride (PVC) film in a wet layer thickness of 6 μm. The layers were dry within 60 seconds. Another property measured was the Lange gloss (60°) after application of a 6 μm thick wet layer to Erichsen test cards printed with black ink [test card for determining hiding power type 24/5 Erichsen; supplier: Erichsen GmbH u. Co. KG, D-5870 Hemer-Sundwig]. The measurement showed an increase from 81.9 to 93.6=14%. The adhesion and abrasion resistance were surprisingly good not only on films but also on the test cardboard.

III. Preparation of the pring ink 67 p of a 30% strength varnish (1b) were pigmented with 15 p of water and 18 p of carbon black (=90% by weight, based on solids). After 3 days of storage the ink was applied.

The 6 μm wet layer was dry in 70 seconds and exhibited good adhesion. After application of a layer to newsprint paper by means of a glass rod the layer was dry at once without striking through. Even 36-μm wet layers remained without strikethrough effect.

3 to 6

I. Preparation of the natural resin acid/formaldehyde reaction products

In Examples (3a) to (5a), different tall resins and in Example (6a) a balsam resin corresponding to Example 1) were each reacted at 160° C. under pressure for 3 hours in a ratio of 1000 p of natural resin:100 p of paraformaldehyde. The parameters of the starting resins and of the reaction products can be found in Table II:

TABLE II

| Parameters of the starting resins | Example | | | |
| --- | --- | --- | --- | --- |
| | (3a) | (4a) | (5a) | (6a) |
| Melting point/°C. | 50 | 55 | 57 | 62 |
| Acid number | 169 | 172 | 160 | 167 |
| Iodine number/Wijs | 200 | 150 | 160 | 270 |
| Viscosity/mPa.s | 54 | 74 | 61 | 44 |
| Melting point/capillary/°C. | 56 | 77 | 70 | 72 |
| Acid number | 141 | 139 | 135 | 147 |
| Viscosity/mPa.s | 254 | 287 | 267 | 960 |
| Free CH$_2$O content/% sulfite method after steam distillation | 0.9 | 1.4 | 1.92 | 0.36 |
| OH number | 94 | 76 | 78 | 133 |

(II) Preparation of the water-dilutable system

Samples (3a) to (6a) were each used to prepare varnishes of the composition below. Table III also shows their solution properties and printing properties.

TABLE III

| Varnish | (3b) | (4b) | (5b) | (6b) |
|---|---|---|---|---|
| Water/p | 290 | 290 | 290 | 290 |
| Ammonia, 25% strength/p | 60 | 60 | 60 | 60 |
| Resin powder (3a)/p | 150 | — | — | — |
| (4a) | — | 150 | — | — |
| (5a) | — | — | 150 | — |
| (6a) | — | — | — | 150 |
| Ethyl alcohol/p | 60 | 60 | 70 | — |
| Clear varnish at room temperature | + | + | + | + |
| Viscosity by Ubbelohde/mPa.s | 178 | 407 | 327 | 640 |
| pH value of varnish | 9.2 | 9.3 | 9.3 | 9.2 |
| Compatibility with electrolyte-free water | 1:1 | 1:0.5 | 1:0.5 | 1:any |
| Drying 6 μm wet layer on PVC film/s | 80 | 80 | 85 | 75 |
| Gloss increase on Erichsen test cards by LANGE/60° in % | 11 | 8 | 9 | 9.5 |

As Table III shows, reaction products 3b) to 5b), having different OH numbers, require different amounts of added alcohol in order to obtain clear and further dilutable varnishes. This is due to the fact that natural resin acids having low iodine numbers combine under identical conditions with smaller amounts of formaldehyde then balsam resin. Against that, sample 6b) composed of balsam resin required no added alcohol. Table III further shows that samples (3b) to (6b) are comparable in their properties to samples (1b) and (2b).

7 to 12

I. Preparation of the natural resin acid/formaldehyde reaction products

In the Examples below, sample (7a) is unesterified, whereas samples (8a) to (12a) have been partially esterified with polycarboxylic acids.

(7a) 10000 p of the tall resin used in Example (3a) and 900 p of paraformaldehyde were heated at 155° C. and 5 bar of maximum pressure for 3 hours.

Yield 10870 p, m.p. 56° C., acid number 141, viscosity 200 mPa.s.

(8a) 1000 p of addition product 7a) were treated at 150° C. with 150 p of maleic anhydride and maintained in successive steps at 160° C., 200° C. and 250° C. for 60 minutes in each case.

Yield 1095 p, m.p. 98° C., acid number 176, viscosity 2710 mPa.s.

(9a) Example (8a) was repeated, using 150 p of fumaric acid in place of maleic anhydride.

Yield 1047 p, m.p. 93° C., acid number 167, viscosity 1273 mPa.s.

(10a) Example (8a) was repeated, except that 250 p of citric acid were added.

Yield 1053 p, m.p. 70° C., acid number 164, viscosity 234 mPa.s.

(11a) 1000 p of an addition product prepared by 4 hours of high-pressure reaction of 1000 p of the tall resin used in Example (3a) with 100 p of paraformaldehyde at 170° C. and having a melting point of 56° C., an acid number of 151 and a viscosity of 254 mPa.s were treated with 50 p of maleic anhydride and 150 p of citric acid as in Example (8a).

Yield 1071 p, m.p. 82° C., acid number 167, viscosity 420 mPa.s (12a) 1000 p of rosin-formaldehyde reaction product according to Example (6a) were treated with 150 p of citric acid and 50 p of maleic anhydride as in Example (11a). Yield 1078 p, m.p. 110° C., acid number 172, viscosity 3560 mPa.s. The binder thus obtained has a significantly higher melting point and a higher viscosity than the identically modified sample prepared from tall resin in Example (11a).

II. Preparation of the water-dilutable system

Table IV shows the composition and the solution and printing properties of the varnishes prepared from the samples of Examples (7a) to (12a).

TABLE IV

| Varnish | (7b) | (8b) | (9b) | (10b) | (11b) | (12b) |
|---|---|---|---|---|---|---|
| Water/p | 290 | 290 | 290 | 290 | 290 | 290 |
| Ammonia, 25% strength/p | 60 | 60 | 60 | 60 | 60 | 60 |
| Pulverized resin (7a)/p | 150 | | | | | |
| (8a) | | 150 | | | | |
| (9a) | | | 150 | | | |
| (10a) | | | | 150 | | |
| (11a) | | | | | 150 | |
| (12a) | | | | | | 150 |
| Ethyl alcohol/p | 60 | 0 | 0 | 60 | 0 | 0 |
| At room temperature, clear | + | + | + | + | + | + |
| Viscosity by Ubbelohde 20° C./mPa.s | 150 | 783 | 2600 | 160 | 3060 | 6350 |
| Compatibility with electrolyte-free H₂O | 1:1 | 1:3 | 1:2 | 1:2 | 1:0.5 1:1 | |
| Drying of 6-μm coats on film | 85 | 66 | 60 | 60 | 70 | 60 |
| Percentage gloss increase in % by 6-μm wet coatings on Erichsen test cards | 10 | 9.6 | 8.4 | 10 | 9.1 | 8.9 |

As the above results show, partial esterification with unsaturated dicarboxylic acids or hydroxycarboxylic acids likewise convertes tall resin/or rosin/ formaldehyde reaction products into partial esters having favorable solution properties. The results are thus completely water-compatible varnishes or varnishes which, after addition of a relatively small amount of alcohol, become sufficiently water-compatible to make them of interest for industrial use.

III. Preparation of the printing inks

The aqueous printing varnishes were admixed with 90% by weight of carbon black, based on their solids contents. The mixture was disperesed in ball mills down to a particle size of below 4 μm. The black inks, applied as 6-μm wet coats to films, dried in the same rapid way as the 6-μm varnish wet coat. On applying the inks with a glass rod or as a 36-μm wet coat to newsprint paper, no strikesthrough was observed. Abrasion resistance and adhesion are good.

13 to 18

I. Preparation of the natural resin acid/formaldehyde reaction products

The Examples below relate to natural resin acid reaction products prepared under atmospheric pressure with or without Lewis acids.

(13a) To 1000 p of rosin in a reaction vessel with attached water separator were added at 130° C. 100 p of xylene and 20 p of a 20% strength zinc chloride solution, and to the mixture were subsequently added at 100° C. 600 p of 37% strength formaldehyde in the couse of 10 min. A product temperature of 110° C. was obtained in 90 min, and the mixture was held at that temperature for 4 hours. A temperature of 160° C. was reached in the course of 60 min with the removal of water.

Yield 1080 p, m.p. 82° C., acid number 152, viscosity 485 mPa.s.

(14a) 1000 p of Portugese rosin were melted and 20 p of 25% strength zinc chloride solution were added. At 100° C. 160 p of paraformaldehyde were added in the course of 10 min. The mixture was heated to 120° C., kept at that temperature for 30 min and then raised to 140° C. for a further 100 min.

Yield 1083 p, m.p. 89° C., acid number 151, viscosity 650 mPa.s.

(15a) 900 p of Chinese rosin and 100 p of the tall resin used in Example (3b) were melted, and 100 p of xylene were added, followed by 100° C. by 20 p of 25% strength zinc chloride solution and 100 p of paraformaldehyde. The mixture was raised to 110° C. in the course of 30 min and then to 120° C. in 30 min, and was maintained at that temperature for 2 hours. 150 p of maleic anhydride were then added, and the mixture was heated to 200° C. and held at 240° C. for 60 min.

Yield 1095 p, m.p. 96° C., acid number 166, viscosity 485 mPa.s.

(16a) Example (15a) was repeated, except that in place of 100 p of paraformaldehyde 160 p of paraformaldehyde were used.

Yield 1113 p, m.p. 85° C., acid number 156, viscosity 660 mPa.s.

(17a) Example (16a) was repeated, using 150 p of fumaric acid in place of maleic anhydride.

Yield 1091 p, m.p. 107° C., acid number 165, viscosity 1700 mPa.s.

(18a) 1000 p of American wood resin were melted, and 100 p of xylene and 20 p of 25% strength zinc chloride solution were added, followed at 100° C. by 160 p of paraformaldehyde. The mixture was maintained at 110° C. for 60 min and at 120° C. for 120 min, 50 p of maleic anhydride were then added, and the mixture was raised to 170° C. in the course of 180 min and then discharged. Yield 1115 p, m.p. 109° C., acid number 162, viscosity 1725 mPa.s.

II. Preparation of the water-dilutable system

Reaction products (13a) to (18a) were in each case used to prepare varnishes having the constituents below, the solution and printing properties of which can be seen from Table V.

to varnishes having favorable solution properties and favorable printing properties. Sample (15b), which has a relatively low paraformaldehyde content, shows a varnish which is clear at room temperature, although the properties obtained are not completely optimal. Example (13a) shows that compatibility with water can be obtained even with aqueous formaldehyde, provided an increased amount of alcohol is added. By contrast, samples (16a) and (17b) require no added alcohol.

A comparison of the values of Table V with those of Table IV, the reaction products of which have been prepared under pressure, shows that the varnishes of Table IV generally require less added alcohol than samples (13b) to (18b) prepared with Lewis acids.

III. Preparation of the printing inks

90% by weight of carbon black, based on the solids content on the varnishes, we added, as well as sufficient water to obtain the following mixing ratios: 18 p of carbon black, 82 p of varnish, alcohol-free or alcohol-containing. These mixtures were dispersed in a ball mill. After 48 hours of storage the black inks were applied to PVC films in a 6-μm wet coat. They dried as rapidly as the original varnishes. Applied to newsprint paper by means of a glass rod, the ink dried immediately without striking through to the back of the paper. Even 36-μm wet coats applied to the same kind of paper did not give rise to any strikethrough.

19 to 22

I. Preparation of the natural resin acid/formaldehyde reaction products

Examples (19a) to (22a) and (19b) to (22b) show that even with small amounts of paraformaldehyde it is possible to obtain systems which are soluble in dilute ammonia. The important factor here is a certain amount of ester bonds, as is obtained in the present Examples with maleic anhydride.

(19a) 1000 p of tall resin were dissolved in 100 p of xylene. 20 p of a 25% strength zinc chloride solution were added, followed by 20 p of paraformaldehyde, and the mixture was heated at 100° to 120° C. for 3 hours and at 140° to 160° C. for 2 hours. After addition of 100 p of maleic anhydride the mixture was partially esterified in the second stage at a temperature of 200° C. in the course of one hour.

Yield 1087 p, m.p. 71° C., acid number 186, viscosity 189 mPa.s.

TABLE V

| Varnish | | (13b) | (14b) | (15b) | (16b) | (17b) | (18b) |
|---|---|---|---|---|---|---|---|
| Water/p | | 290 | 290 | 290 | 290 | 290 | 290 |
| Ammonia, 25% strength/p | | 60 | 60 | 60 | 60 | 60 | 60 |
| Resin powder from Ex. | (13a)/p | 150 | | | | | |
| | (14a) | | 150 | | | | |
| | (15a) | | | 150 | | | |
| | (16a) | | | | 150 | | |
| | (17a) | | | | | 150 | |
| | (18a) | | | | | | 150 |
| Ethyl alcohol/p | | 90 | 30 | 80 | — | — | 20 |
| Clear varnish at room temperature | | + | + | + | + | + | + |
| Containing sediment | | — | — | + | — | — | — |
| Viscosity 20+ C./mPa.s | | 72 | 965 | — | 2600 | 5500 | 2210 |
| Compatability with electrolyte-free water | | 1:1.5 | 1:2 | — | 1:4 | 1:2 | 1:1 |
| Drying of 6-μm wet coat on PVC film/S | | 70 | 95 | — | 75 | 60 | 65 |
| Gloss increase on Erichsen test cards by LANGE/60° in % | | — | 11.5 | — | 10.2 | 8.7 | 9.5 |

As Table V shows, natural resin/formaldehyde reaction products prepared with Lewis acids likewise lead (20a) Example (19a) was repeated, except that only 40 p of paraformaldehyde were reacted.

Yield 1112 p, m.p. 79° C., acid number 186, viscosity 331 mPa.s.

(21a) Example (19a) was repeated, except that only 60 p of paraformaldehyde were reacted.

Yield 1121 p, m.p. 83° C., acid number 185, viscosity 415 mPa.s.

(22a) Example (18a) was repeated, except that 80 p of paraformaldehyde were reacted.

Yield 1131 p, m.p. 83° C., acid number 184, viscosity 486 mPa.s.

II. Preparation of the water-dilutable system.

Examples (19a) to (22a) were used to prepare varnishes of the compositions below having the solution and printing properties indicated in Table VI.

TABLE VI

| Varnish | (19b) | (20b) | (21b) | (22b) |
|---|---|---|---|---|
| Water/p | 290 | 290 | 290 | 290 |
| Ammonia, 25% strength/p | 60 | 60 | 60 | 60 |
| Resin powder from Ex. (19a)/p | 150 | — | — | — |
| (20a) | — | 150 | — | — |
| (21a) | — | — | 150 | — |
| (22a) | — | — | — | 150 |
| After 1 h/60° C., all resin dissolved | + | + | + | + |
| Water dilutability of varnish | 1:0.4 | 1:0.5 | 1:0.6 | 1:0.8 |
| Addition of ethyl alcohol/p | 80 | 80 | 80 | 80 |
| Water dilutability of alcohol-containing varnish | 1:6 | ∞ | ∞ | ∞ |
| Drying of 6-μm wet coat/film/s | 80 | 75 | 75 | 70 |

As Table VI shows, it is true that the samples are soluble in undiluted ammonia, but the water dilutability is only within the range from 1:0.4 to 1:0.8. Only addition of alcohol gives varnishes which are further dilutable with water and which have a low viscosity and dry rapidly. Table VI also shows that paraformaldehyde contents of only 2% lead to varnishes having surprisingly good properties.

III. Preparation of the printing inks 18 p of carbon black, 67 p of varnish samples (19b) to (22b) and 15 p of water were used to prepare printing inks having an efflux time (4 mm DIN 53211 cup) of 15 to 16.5 s. The printing properties can be seen from the Table VII.

TABLE VII

| Printing ink from varnish | (19b) | (20b) | (21b) | (22b) |
|---|---|---|---|---|
| Drying of 6-μm wet coat on PVC film/s | 85 | 60 | 60 | 55 |
| Gloss on Erichsen test cards by Lange/60° in % | 6.7 | 12.1 | 18.6 | 26.4 |
| Coat applied with glass rod to newsprint paper, gloss by Lange/60° in % | 3 | 4.1 | 3.9 | 3.9 |

As the Table shows, the rate of drying on PVC film and the gloss on test cards increase with the increasing formaldehyde content. Even on newsprint paper the samples with the relatively high formaldehyde content have advantages over the sample with the lowest formaldehyde content. All these examples are distinguished by surprisingly high gloss.

23 to 25

I. Preparation of the natural resin acid/formaldehyde reaction products

Examples (23a) to (25a) are based on natural resin acid/formaldehyde reaction products which have been prepared by addition reaction of aqueous formaldehyde solutions without catalysts under atmospheric pressure.

(23a) 750 p of balsam resin, 75 p of xylene and 450 p of 37% strength formaldehyde were heated at 110° C. for 4 hours. By removing water the product temperature was raised to 140° C. in 60 min and then to 160° C. in a further 60 min. 187.5 p of citric acid were then added, and the mixture was held at 200° C. for 2 hours.

Yield 865 p, m.p. 84° C., acid number 181, viscosity 407 mPa.s.

(24a) Example (23a) was repeated, except that instead of the citric acid 112.5 p of maleic anhydride were reacted. Yield 890 p, m.p. 112° C., acid number 187, viscosity 5000 mPa.s.

(25a) Example (23a) was repeated, except that instead of the citric acid 112.5 p of fumaric acid were reacted. Yield 873 p, m.p. 139° C., acid number 184, viscosity 20000 mPa.s.

II. Preparation of the water-dilutable system

Examples (23a) to (25a) were used to prepare varnishes having the composition listed in Table VIII. Table VIII also shows the solution and printing properties of these varnishes.

TABLE VIII

| Varnish | (23b) | (24b) | (25b) |
|---|---|---|---|
| Water/p | 290 | 290 | 290 |
| Ammonia, 25% strength/p | 60 | 60 | 60 |
| Resin powder from Ex. (23a)/p | 150 | — | — |
| (24a) | — | 150 | |
| (25a) | — | — | 150 |
| Varnish clear at room temperature | + | + | + |
| Compatability with water | 1:0.5 | 1:1 | 1:1 |
| Addition of ethyl alcohol/p | 30 | — | — |
| Viscosity in mPa.s | 187 | 225 | 19500 |
| Drying of 6-μm wet coat on film/s | 75 | 70 | 125 |

26 to 29

I. Preparation of the natural resin acid/formaldehyde reaction products (26a) to (28a) (two-stage process). 1000 p of Portuguese balsam resin and 105 p of paraformaldehyde were used in the first stage at 150° C. to obtain in a high pressure reaction in the course of 300 min a formaldehyde/resin reaction product having the following parameters:

M.p. 73° C., acid number 148, viscosity 830 mPa.s. 1000 p of this addition product were heated to 220° C. with 250 p of citric acid in the course of 60 min and were maintained at 220° C. for 180 min.

Yield 1068 p, m.p. 102° C., acid number 177, viscosity 1290 mPa.s.

The product obtained was used as a binder for varnishes (26b) to (28b).

(29a) 1000 p of the rosin formaldehyde reaction product prepared in the first stage as described in Example (26a) were reacted at 180° C. with 244 p of malic acid for 4 hours.

Yield 1148 p, m.p. 133° C., acid number 212

II. Preparation of the water-dilutable system

Sample (26a), modified with citric acid, was used to prepare 3 varnishes (26b) to (28b), of which varnish (26b) contained no additive, varnish (27b) additionally contained crystallized sugar and varnish (28b) additionally contained crystallized sugar and urea.

Sample (29a) had added to it sodium tripolyphosphate and was processed to give a clear varnish.

Table IX shows the composition of varnishes and their solution and printing properties.

TABLE IX

| Varnish | (26b) | (27b) | (28b) | (29b) |
| --- | --- | --- | --- | --- |
| Water/p | 290 | 379.5 | 379.5 | 278.5 |
| Ammonia, 25% strength/p | 60 | 60 | 60 | 34 |
| Ethanol | — | — | — | 37.5 |
| Resin powder (26a)/p | 150 | 150 | 150 | 105 |
| Crystallized sugar/p | — | 38.3 | 20 | — |
| Urea/p | — | — | 18.3 | — |
| Sodium polyphosphate/p | — | — | — | 45 |
| Viscosity/Ubbelohde/20° C./mPa.s | 6600 | 2280 | 1400 | 1100 |
| pH value of bright varnishes | 9.8 | 9.9 | 9.6 | 8.2 |
| Compatability with electro-Lyte-free water | 1:0.5 | 1:0.8 | 1:0.8 | 1:2 |
| Drying of 6-μm wet coat on PVC film/s | 80 | 80 | 74 | 80 |
| Gloss increase on Erichsen test cards by LANGE/60° C. in % | 9 | 10.2 | 11 | 9.8 |

As Table IX shows, the additives have a viscosity-reducing effect. It is thus possible to prepare solutions of a higher concentration, which is advantageous for obtaining printing inks of higher gloss.

III. Preparation of the printing inks

Varnishes (26b) to (28b) were in each case prepared with 90% by weight of carbon black, based on solids content, to give black inks which, applied to newsprint paper as a wet coat by means of glass rod, dry at once and have good adhesion without striking through to the back of the paper.

67 p of varnish (29b), 18 p of carbon black and 15 p of water were used to prepare a printing ink having a capillary viscosity of 530 mPa.s. After 48 hours of storage a 6-μm coating of the ink on PVC film dried in 75 s. Applied to newsprint paper by means of a glass rod, the ink dried immediately without striking through. Even an ink coat having a wet layer thickness of 36 μm did not produce any strikethrough.

30 to 33

I. Preparation of the natural resin acid/formaldehyde reaction products

Examples (30a) to (33a) start from the same citric acid modified reaction product as is described in Example (26a).

II. Preparation of the water dilutable system

The Examples below show the preparation of varnishes with very small amounts of ammonia.

Table X summarizes the composition of the varnishes and also their solution and printing properties.

TABLE X

| Varnish | (30b) | (31b) | (32b) | (33b) |
| --- | --- | --- | --- | --- |
| Water/p | 290 | 290 | 290 | 290 |
| Ammonia, 25% strength/p | 50 | 40 | 30 | 25 |
| Resin powder of Ex. (26a)/p | 150 | 150 | 150 | 150 |
| After preparation clear | + | + | + | + |
| Water-dilutable | ∞ | ∞ | ∞ | ∞ |
| Viscosity/mPa.s | 2960 | 1780 | 1320 | 1050 |
| pH value | 8.8 | 8.6 | 8.6 | 8.0 |
| Drying of 6-μm wet coat/film/s | 75 | 75 | 75 | 70 |
| After 24 h storage | cloudy | cloudy | clear | clear |
| Odor of ammonia | Yes | Yes | Yes | No |
| Dilutable with water in any proportion | + | + | + | + |

Even though individual samples became cloudy on storage, they are nonetheless dilutable with water to any proportion and thus suitable for various practical purposes.

III. Preparation of the printing inks 18 p of carbon black, 67 p of sample (33b) and 15 p of water were used to prepare printing ink having a capillary viscosity of 430 mPa.s. Applied to PVC film, a 6-μm wet coat dries in 65 s and is highly abrasion-resistant. A coat applied to newsprint paper with a glass rod dried at once without striking through; nor did a 36-μm wet coat produce strikethrough.

The ink produced from varnish (33b) thus has despite the low ammonia content satisfactory printing properties.

Use of organic amines

I. Preparation of the water dilutable system:

(35) 80 p of the rosin/formaldehyde adduct prepared in Example (1a) were heated with stirring at about 80° C. together with 16.6 p of dimethylethanolamine and 170 p of deionized water until a solution had formed (about 1 hour). The clear solution had a solids content of 36.2% and a viscosity of 550 mPa.s.

(36) 80 p of the rosin/formaldehyde adduct prepared in example (1a) were heated with stirring at about 80° C. together with 55.1 p of diisopropanolamine and 137 p of deionized water until a clear solution had formed (about 1 hour), which possessed the following properties: 49.6% solids content, 1400 mPa.s.

II. Preparation of the disperse varnishes:

(35a) The varnish solution prepared in Example (35) was set with the addition of 3% by weight of ethanol and 31.4% by weight of water (based on starting varnish solutions) to a viscosity of 18 sec/DIN 53211-4 mm. The solids content of this varnish was 25% (measured at 90°/2.5 hour).

(36a) The varnish solution prepared in Example (36) was set with the addition of 3.6% by weight of ethanol and 55.4% by weight of water (based on starting varnish solution) to a viscosity of 18 sec/DIN 53211-4 mm. The solids content of this varnish was 23% (measured at 90°/2.5 hours).

III. Preparation of the printing inks (35b) and (36b) 18.2 p of carbon black and 43.6 p of disperse varnish (35a, 36a) (18 sec/DIN 53211-4 mm) were predispersed in a dissolver; addition of 9.1 p of water, 0.1 p of defoamer (®Nopco 8034 from Münzing, Heilbronn) was followed by dispersing for 25 minutes in a bead mill, and subsequently 29.0 p of the corresponding disperse varnishes were carefully stirred in in each case. In each case 100 p of ink having a viscosity of 18.5 sec/DIN 53211-4 mm (35b) and 15.6 sec/DIN 53211-4 mm (36b) were obtained.

Inks (35b) and (36b) were applied to a newsprint paper (55 g/m$^2$) in thicknesses of 6, 12 and 36 μm and in each case exhibited satisfactory properties with respect to abrasion resistance, wet wipe resistance, drying and holdout on the paper.

We claim:

1. A printing ink containing printing additives selective from the group consisting of carbon black and colored pigments and a water-dilutable printing ink binder system based on a binder in the form of a clear and stable, dilute, ammoniacal or amine-containing solution, the binder being a product of reacting a natural ressin acid and formaldehyde in at least one stage, the amount of (100% strength) formaldehyde being 1 to 25% by weight, based on the natural resin acid, and the reaction having been carried out under atmospheric or superatmospheric pressure in the absence or in the presence of 0.1 to 2% by weight of a Lewis acid catalyst.

2. A printing ink containing printing additives selective from the group consisting of carbon black and colored pigments and a water-dilutable printing ink binder system based on a binder in the form of a clear and stable, dilute, ammoniacal or amine-containing solution, the binder being a product of reacting a natural resin acid and formaldehyde in at least one stage, the amount of (100% strength) formaldehyde being 1 to 25% by weight, based on the natural resin acid, and the reaction having been carried out under atmospheric or superatmospheric pressure in the absence or in the presence of 0.1 to 2% by weight of a Lewis acid catalyst, the natural resin acid/formaldehyde reaction product being partially esterified with at least one polycarboxylic acid unit of the selected group (a) at least one member of the group obtaining an ethylenically unsaturated dicarboxylic acid, (b) the anhydride thereof and (c) a hydroxycarboxylic acid.

3. In a flexographic printing process, the improvement comprising using a printing varnish of claim 1.

4. In a flexographic printing process, the improvement comprising using a printing varnish of claim 2.

5. In a letter press or offset printing process, the improvement comprising using a printing ink of claim 1.

6. In a letter press or offset printing process, the improvement comprising using a printing ink of claim 2.

* * * * *